Figure 1:
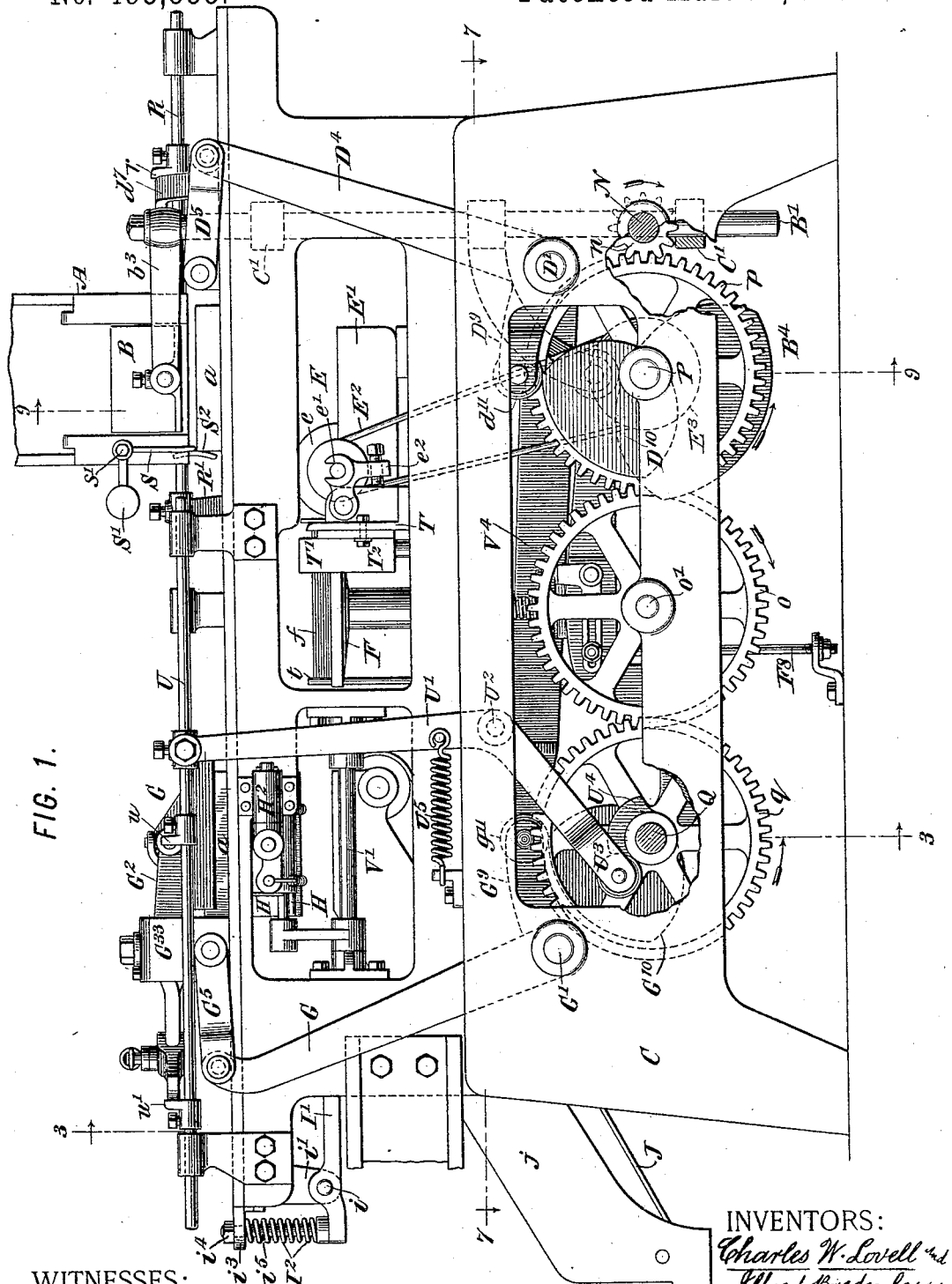

(No Model.) 13 Sheets—Sheet 3.

C. W. LOVELL & A. BREDENBERG.
BOOK COVERING MACHINE.

No. 493,553. Patented Mar. 14, 1893.

WITNESSES:
C. E. Ashley
H. W. Lloyd.

INVENTORS:
Charles W. Lovell and
Alfred Bredenberg,
By their Attorneys,
Arthur C. Fraser & Co.

(No Model.) 13 Sheets—Sheet 4.

C. W. LOVELL & A. BREDENBERG.
BOOK COVERING MACHINE.

No. 493,553. Patented Mar. 14, 1893.

WITNESSES:
C. E. Ashley
F. W. Lloyd.

INVENTORS:
Charles W. Lovell and
Alfred Bredenberg,
By their Attorneys,
Arthur C. Fraser & Co.

(No Model.) 13 Sheets—Sheet 5.

C. W. LOVELL & A. BREDENBERG.
BOOK COVERING MACHINE.

No. 493,553. Patented Mar. 14, 1893.

WITNESSES:
C. E. Ashley
I. H. W. Lloyd.

INVENTORS:
Charles W. Lovell and
Alfred Bredenberg,
By their Attorneys,
Arthur E. Fraser & Co.

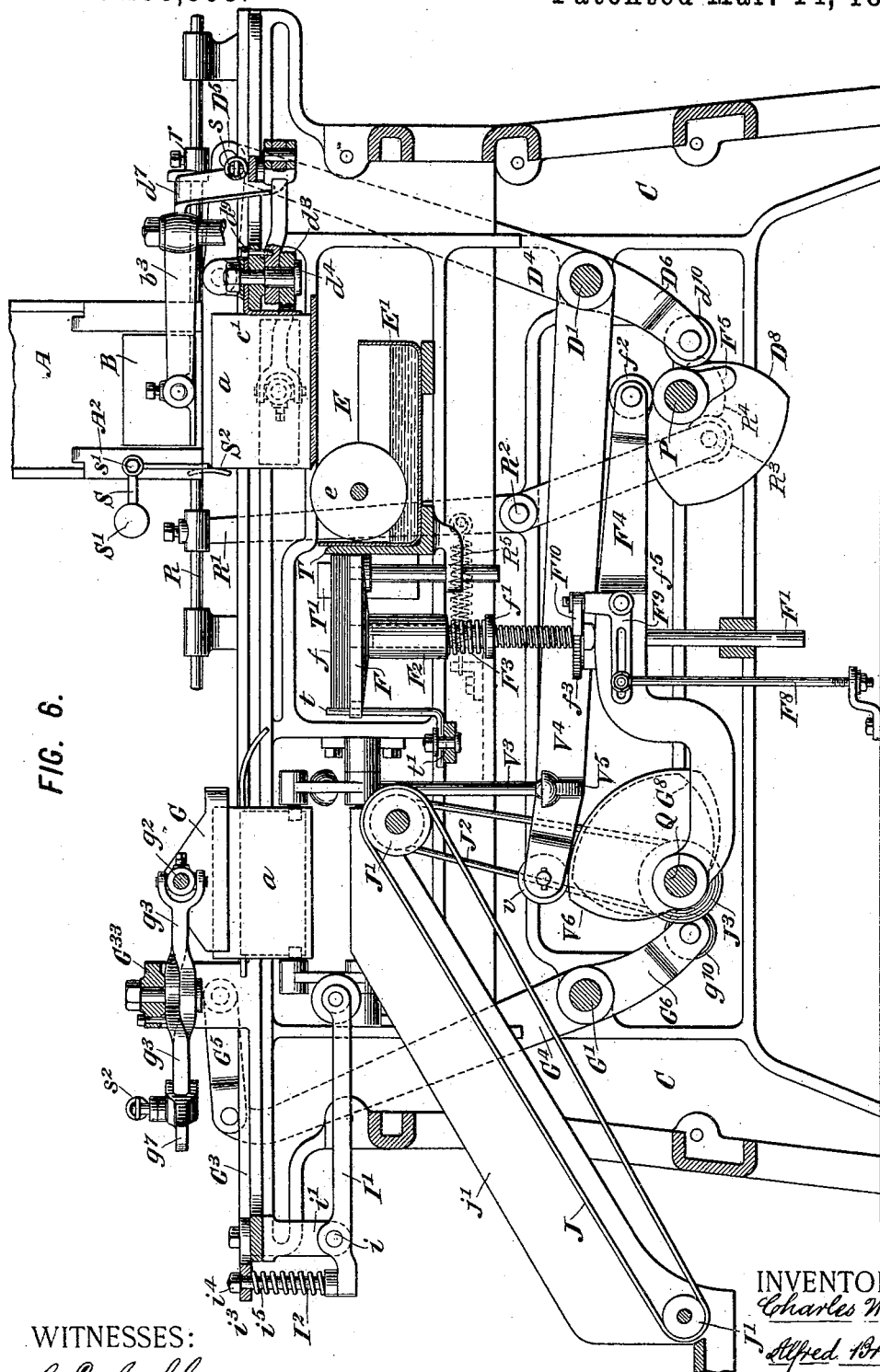

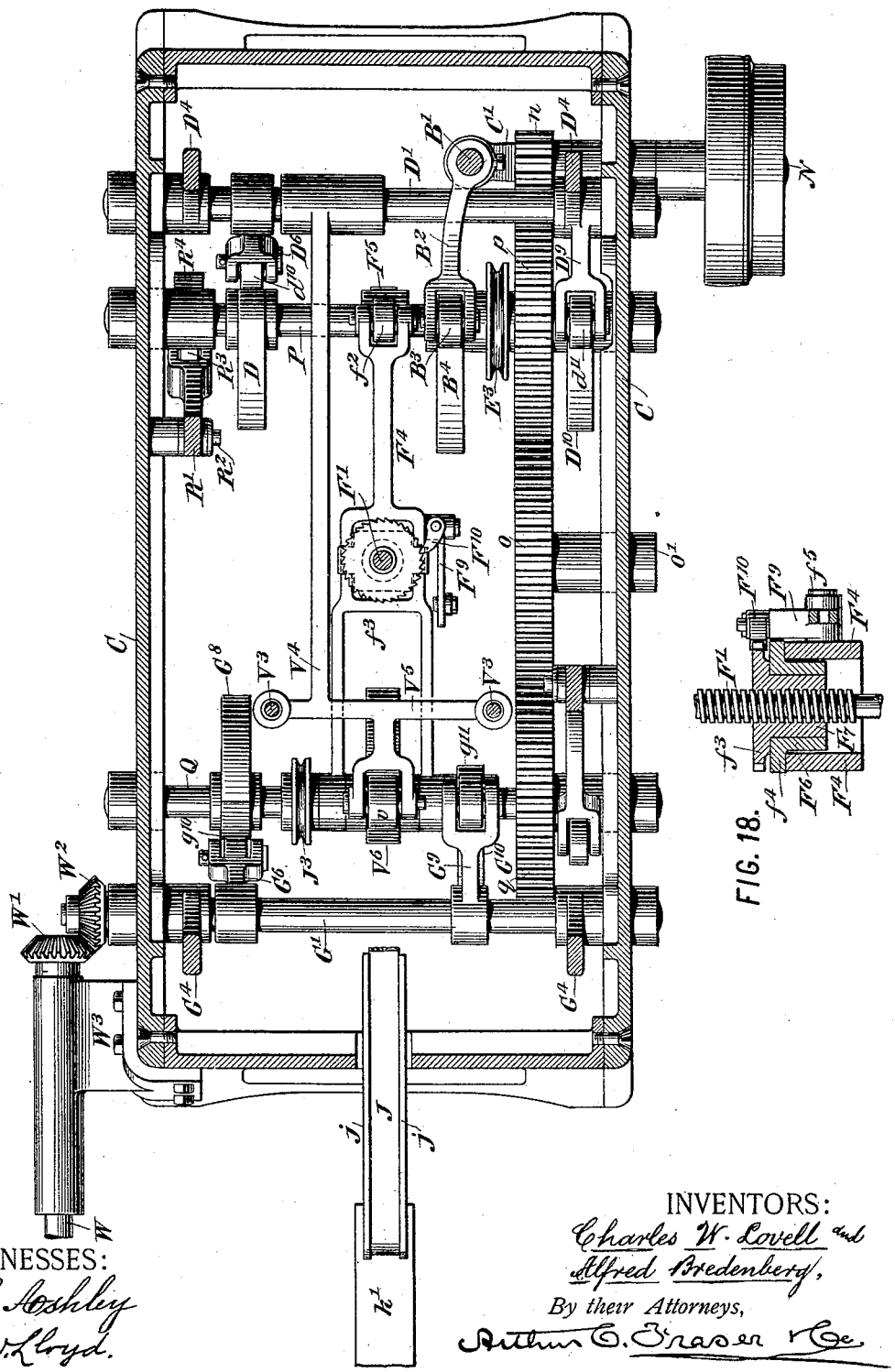

(No Model.) 13 Sheets—Sheet 8.
C. W. LOVELL & A. BREDENBERG.
BOOK COVERING MACHINE.
No. 493,553. Patented Mar. 14, 1893.
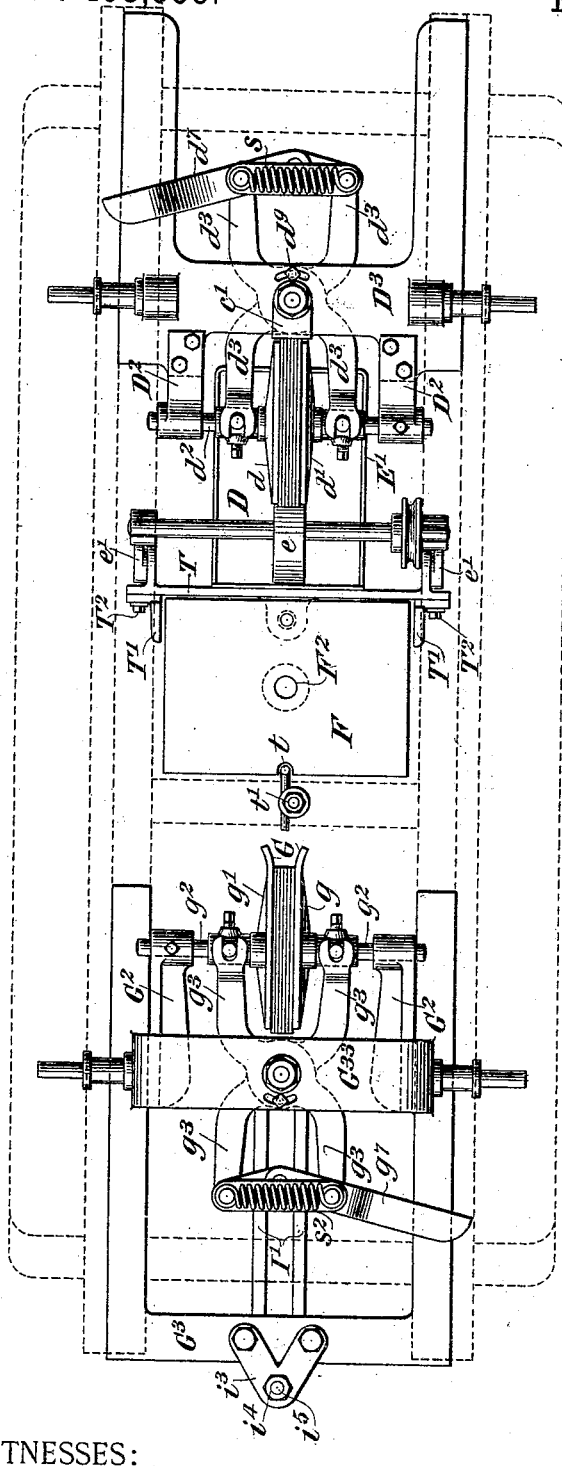
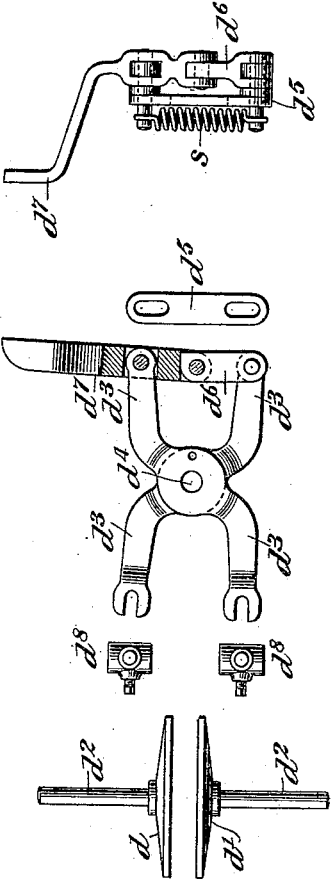
WITNESSES:
C. E. Ashley
I. H. W. Lloyd
INVENTORS:
Charles W. Lovell and
Alfred Bredenberg,
By their Attorneys,
Arthur E. Fraser & Co.

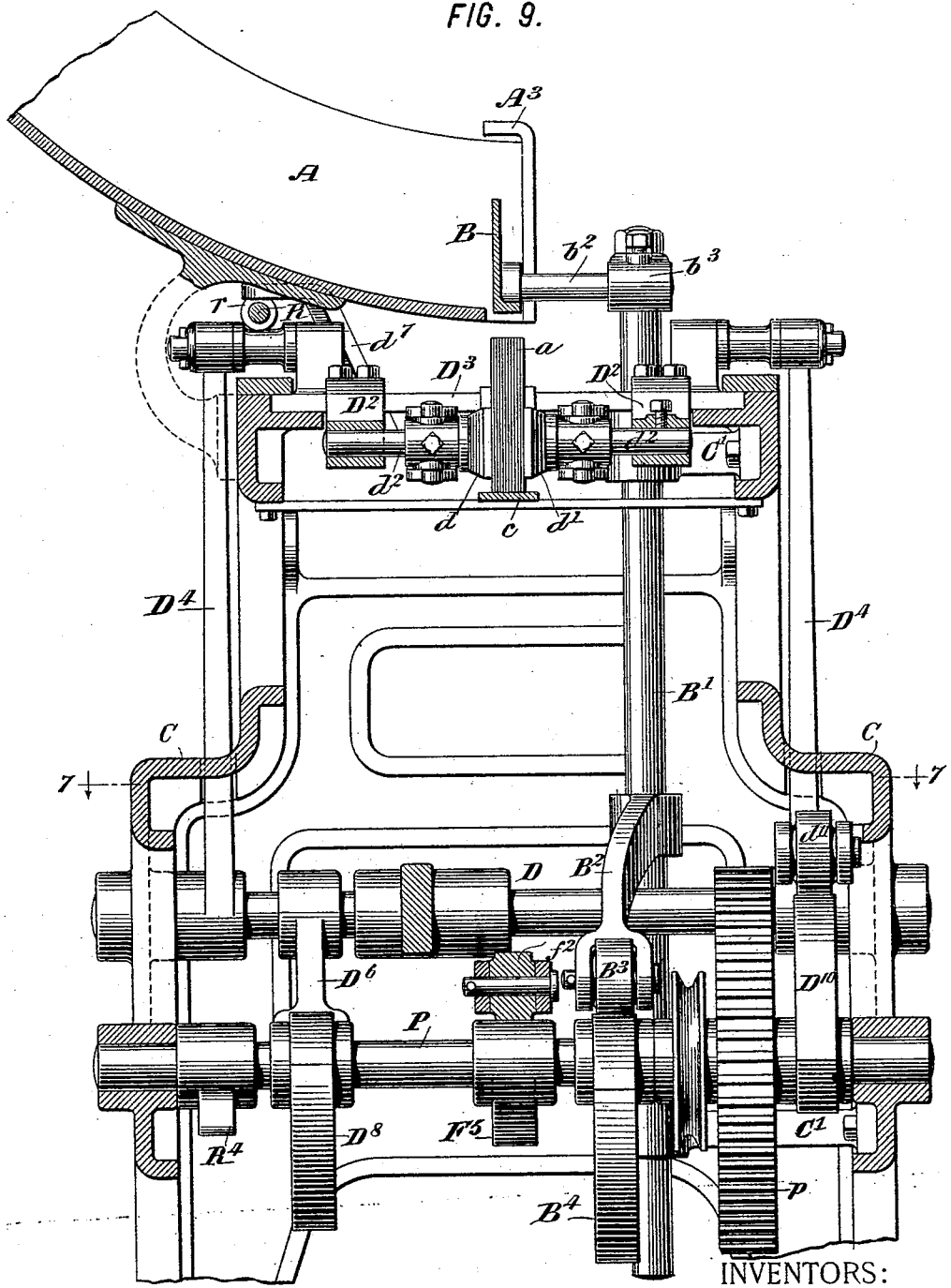

(No Model.) 13 Sheets—Sheet 10.
C. W. LOVELL & A. BREDENBERG.
BOOK COVERING MACHINE.
No. 493,553. Patented Mar. 14, 1893.
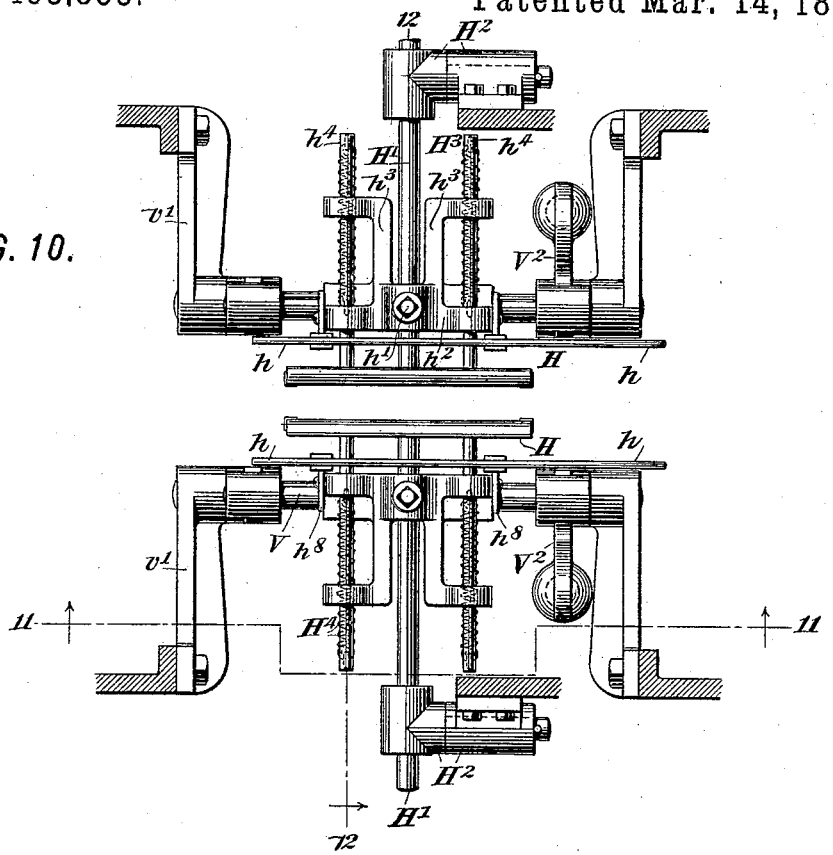
FIG. 10.
FIG. 11.
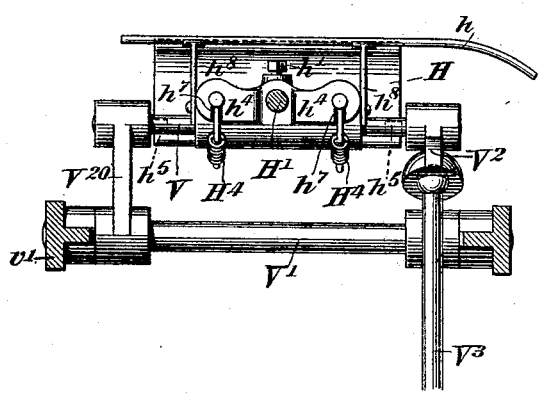
WITNESSES:
C. E. Ashley
H. W. Lloyd.
INVENTORS:
Charles W. Lovell and
Alfred Bredenberg,
By their Attorneys,
Arthur C. Fraser & Co.

(No Model.) 13 Sheets—Sheet 11.
C. W. LOVELL & A. BREDENBERG.
BOOK COVERING MACHINE.

No. 493,553. Patented Mar. 14, 1893.

WITNESSES:
C. E. Ashley
H. W. Lloyd.

INVENTORS:
Charles W. Lovell and
Alfred Bredenberg,
By their Attorneys,
Arthur C. Fraser & Co.

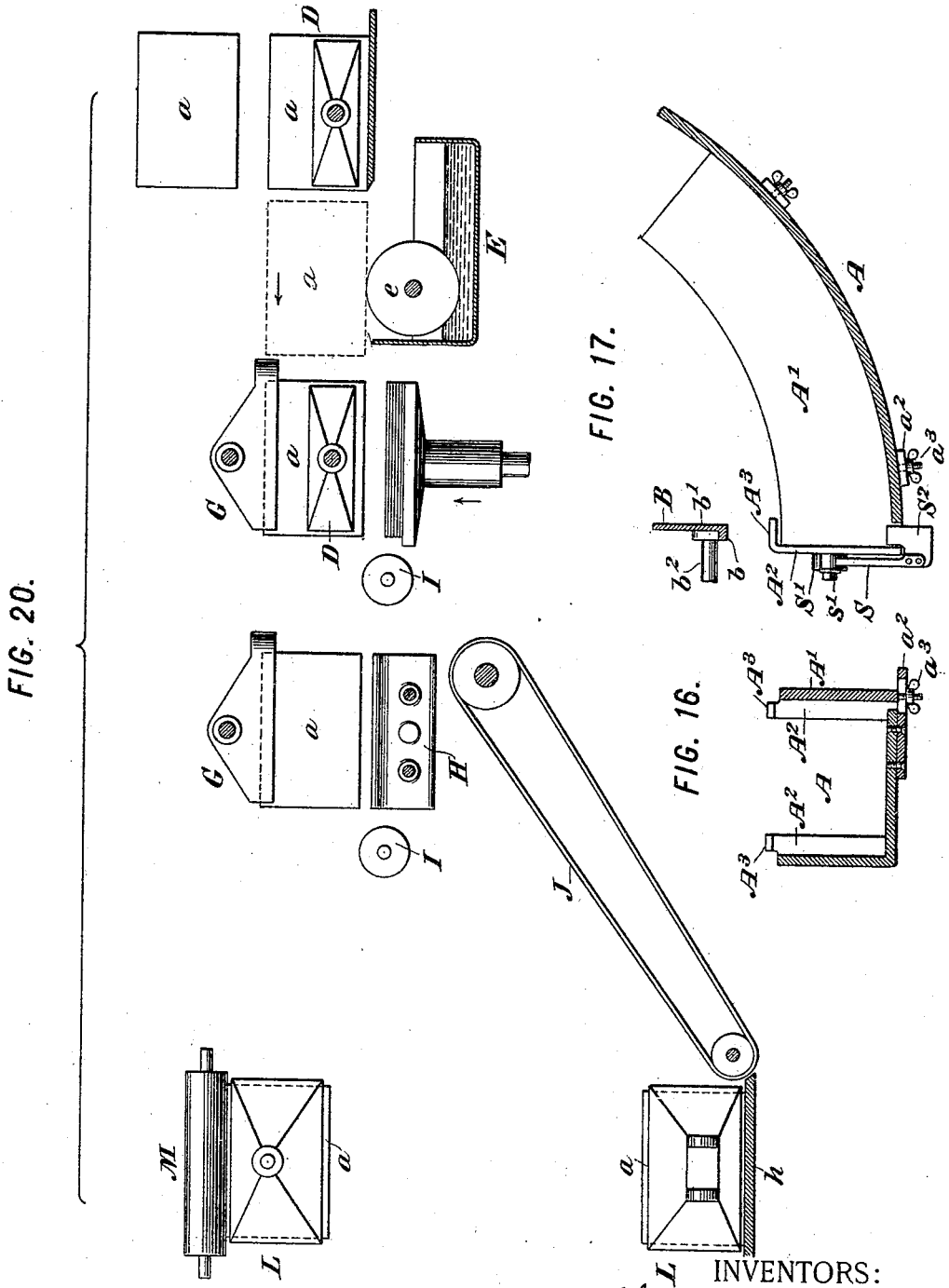

(No Model.) 13 Sheets—Sheet 13.

C. W. LOVELL & A. BREDENBERG.
BOOK COVERING MACHINE.

No. 493,553. Patented Mar. 14, 1893.

WITNESSES:
C. E. Ashley
I. H. W. Lloyd.

INVENTORS:
Charles W. Lovell and
Alfred Bredenberg,
By their Attorneys,
Arthur C. Fraser & Co.

UNITED STATES PATENT OFFICE.

CHARLES W. LOVELL AND ALFRED BREDENBERG, OF BROOKLYN, NEW YORK.

BOOK-COVERING MACHINE.

SPECIFICATION forming part of Letters Patent No. 493,553, dated March 14, 1893.

Application filed July 18, 1889. Serial No. 317,944. (No model.)

*To all whom it may concern:*

Be it known that we, CHARLES W. LOVELL and ALFRED BREDENBERG, citizens of the United States, and residents of Brooklyn, in the county of Kings and State of New York, have invented certain new and useful Improvements in Book-Covering Machines, of which the following is a specification.

Our invention relates to machines for automatically applying covers to books, pamphlets and the like, the cover being attached to the back of the book by suitable adhesive material.

In the operation of book covering as heretofore practiced by hand, the operator picks up the book (the leaves of which have been already stitched or fastened together at the back) and holding it in one hand, with the other applies glue or other adhesive material to the back of the book. He then presses the glued back of the book against the middle of a cover, the latter lying in its flat or unfolded condition, whereby the cover is attached to the back of the book. He then folds or bends the sides of the cover around the edges of the back of the book and against the sides thereof, sharply bending or breaking the cover around the edges of the back, and he finally rubs down or smoothes the cover against the back of the book and lays the bound book away to dry.

Our invention provides a machine for accomplishing these operations automatically. It is especially designed for applying paper covers to books or pamplets, although applicable to covers of other character.

According to our invention in its entirety, the following described operations are automatically performed:—The books to be covered are automatically fed one after another from a pile or stack, each book as fed dropping back downward upon a gage-plate or table, and between the opposite jaws or plates of a book holder or clamp. Its correct position relatively to the clamp is assured by the provision of a gage against which one end of the book is stopped. The clamp closes upon the book, holding it firmly with its back exposed or projecting beyond the jaws of the clamp. The back of the book is then gummed by means of a gummer for applying glue or other adhesive material to the back, and which is conveniently constructed as a roller revolving in a bath of the adhesive material, and moving relatively to the book so that it rolls along the back of the book. A cover-applier then acts to apply the middle of a cover against the gummed back of the book while the latter is held in the book holder or clamp. The cover-applier consists of a table or presser-plate, and is movable relatively to the book holding clamp in order that a cover interposed between said table and the back of the book shall by the relative approach of the book and table be pressed firmly against the back of the book. Thus the cover is united to the gummed back of the book, the cover being still in flat or unfolded condition. The next operation consists in folding the projecting sides of the cover upwardly against the sides of the book so as to fold or break the material of the cover around the side edges or corners of the book back. The cover is then pressed or rubbed into firmer contact with the book back by means of a back-presser roller rolling against the book back from end to end. This back pressing or rolling operation is subsequently repeated successively while the book is held in a clamp which carries it for a sufficient time to enable the adhesive material by which the cover is united to the book to sufficiently dry or set. The covered book is finally discharged from the machine by being automatically delivered from the clamp by which it has been carried.

In the embodiment of our invention in a practical machine, we have adopted by preference the following described relative constructions and arrangements of the active parts by which the operations upon the book and cover are performed. The stack of books is contained in a chute or trough, from the lower end of which the books are fed out or expelled successively and automatically by a reciprocating plunger or book pusher acting at each movement to expel one book and cause it to drop into the book holder or clamp. The gummer is arranged stationary, and the book holder or clamp is mounted on a book carrier by which, after the clamp grips the book, it is carried over the gummer, so that the back of the book by moving against the gumming roller, has the adhesive material applied to it in transit. The carrier then stops and remains stationary while the cover-applier operates. The book being thus held immovably, the cover-applying table or presser-plate is constructed to reciprocate toward and from the book holder, so that it acts to press an interposed cover against the book back. The cover to be applied rests upon this presser-plate or table, one or more covers being placed thereupon in a flat or unfolded condition. After the cover is thus applied, the book is then carried to a third position where it comes over the cover folders by which the sides of the cover are folded up against the sides of the book. As the book is held between clamping jaws, leaving only the back portion of the book exposed and projecting, only those portions of the sides of the cover adjacent to the book back are actually folded and pressed against the sides of the book. The book is then conveyed to a fourth position, and subsequently to fifth, sixth, seventh, &c., positions by successive movements, in order to afford time for the adhesive material to dry or set. In these successive positions the cover is pressed or rubbed against the book back by the action of back pressers or pressure rollers rolling across the back of the book. In our machine each book is advanced intermittently from one stopping position to the next, passing from the initial feeding position to the final delivery position. As each book is advanced from one position to the next beyond, the following book is moved to the position which it has just vacated, there being thus a series of books in the machine at one time undergoing the successive operations, all being moved forward simultaneously at one moment and all then standing still in the several operative positions while the respective operations are being performed upon them, and being then again moved forward, and so on. These several simultaneous advancing movements of the successive books, alternated with their periods of rest, are imparted by what as a whole we designate "book-carrying mechanism." This mechanism in the present specific embodiment of our invention comprises a succession of book clamping and carrying devices and the driving mechanism for operating them, so that they co-operate to engage the successive books and pass them by step-by-step movements from one device to the next, and thereby move them through the machine.

In the specific embodiment of our invention comprised in the machine illustrated in the present application for patent, the book is engaged by successive clamps or carriers, a primary book holder or clamp grasping the book in the feeding position and carrying it over the gummer to the second position; a second book holder or clamp engages it in this position and upon its release by the first clamp carries it to the third or cover folding position; the cover folders then, after acting to fold the covers, serve to again clamp and hold the book while the secondary clamp releases it and executes its return movement; the cover folders hold the book clamped between them with its cover tightly stretched around the book back while the back of the book is rolled by the longitudinally moving pressing roller, after which the return movement of the cover folders releases the covered book; the book is then carried by a conveyer and introduced between the jaws of a fourth clamp, comprising a part of what we designate the drying mechanism; this clamp closes upon the book and holds it during its successive movements to the fifth, sixth, &c., positions while it is being dried, and while its back is being pressed by the spring-seated pressure rollers before referred to; finally this fourth clamp opens and releases the book, which is discharged out of the machine.

Figure 2:
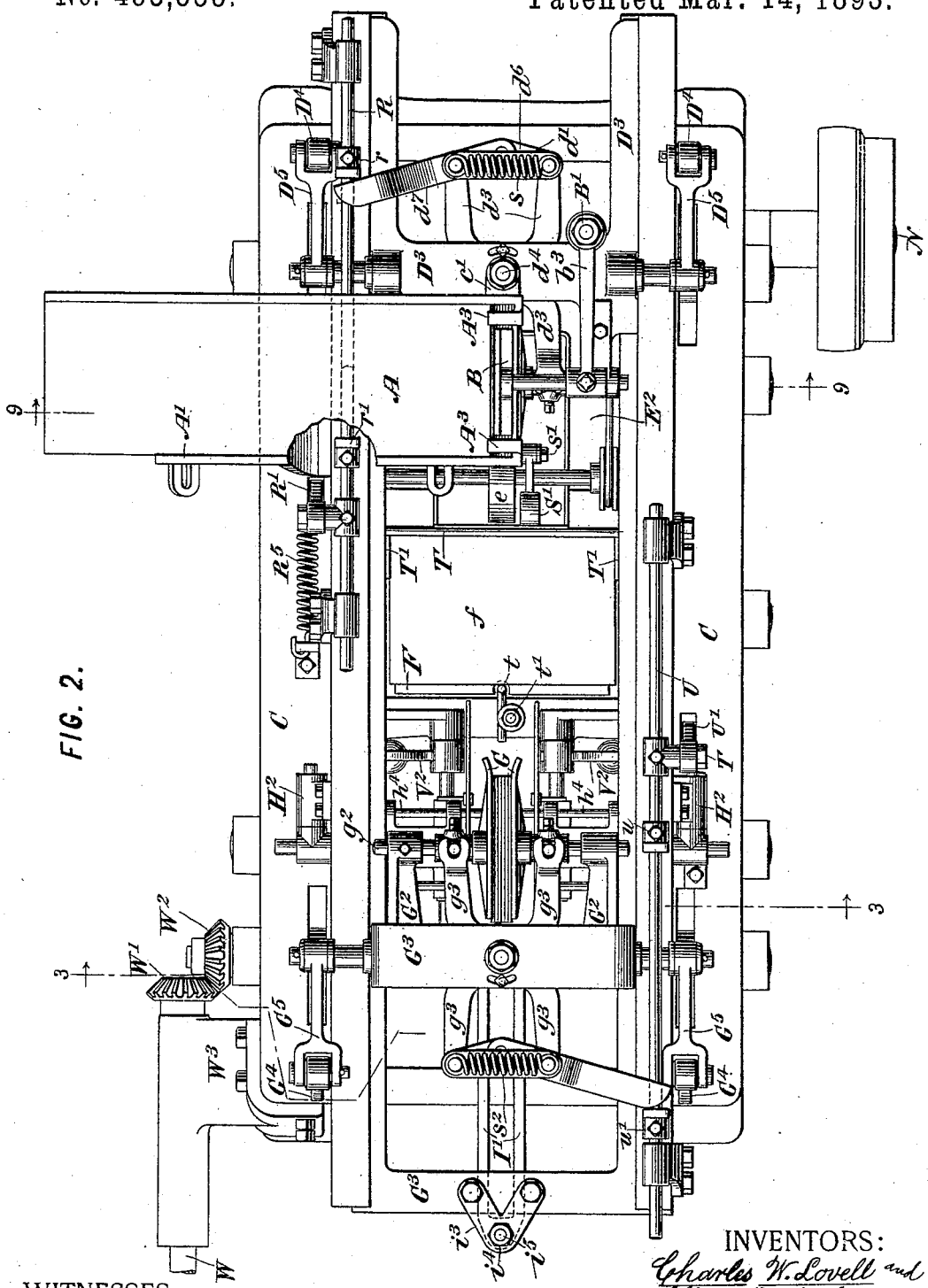
Figure 3:
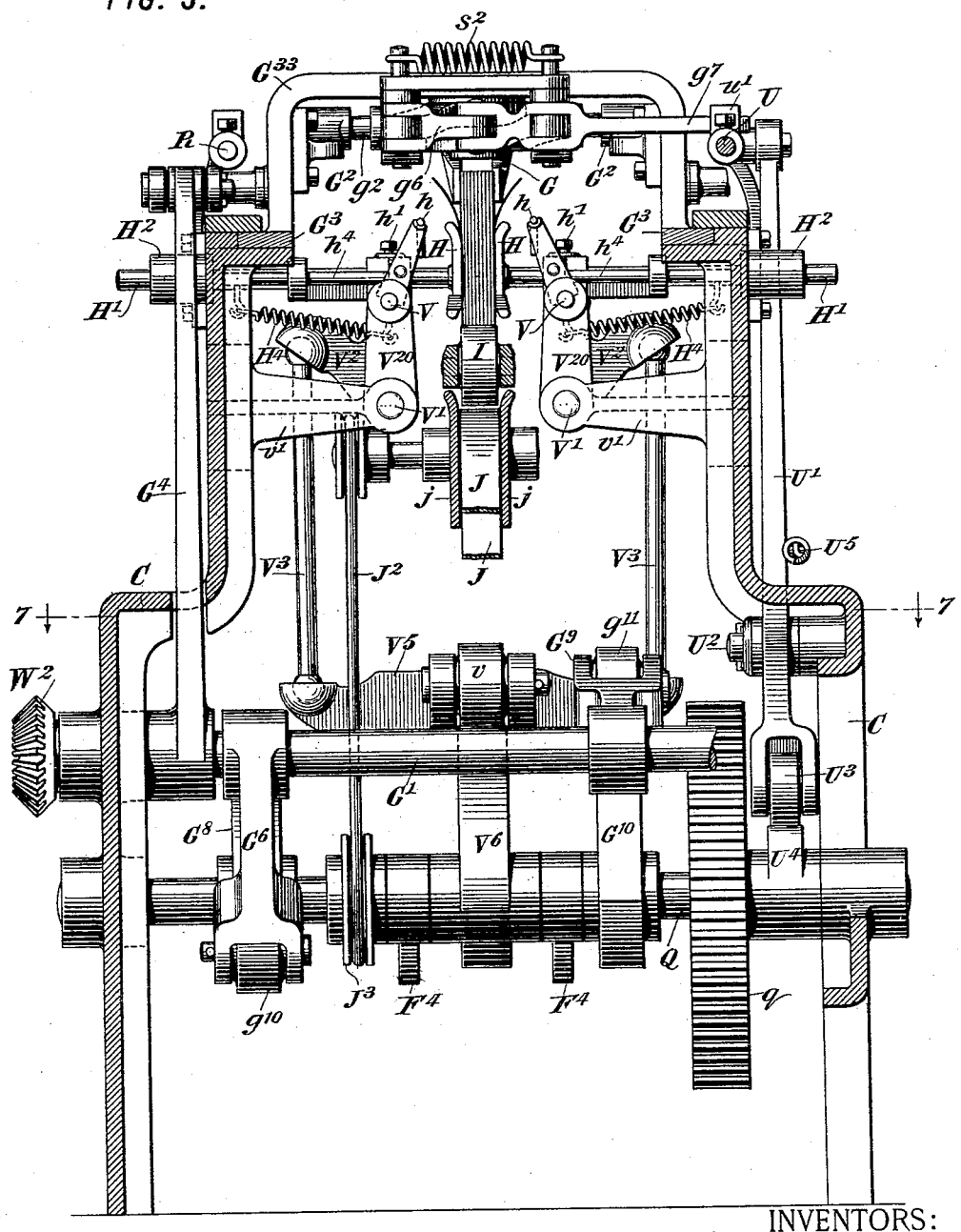
Figure 4:
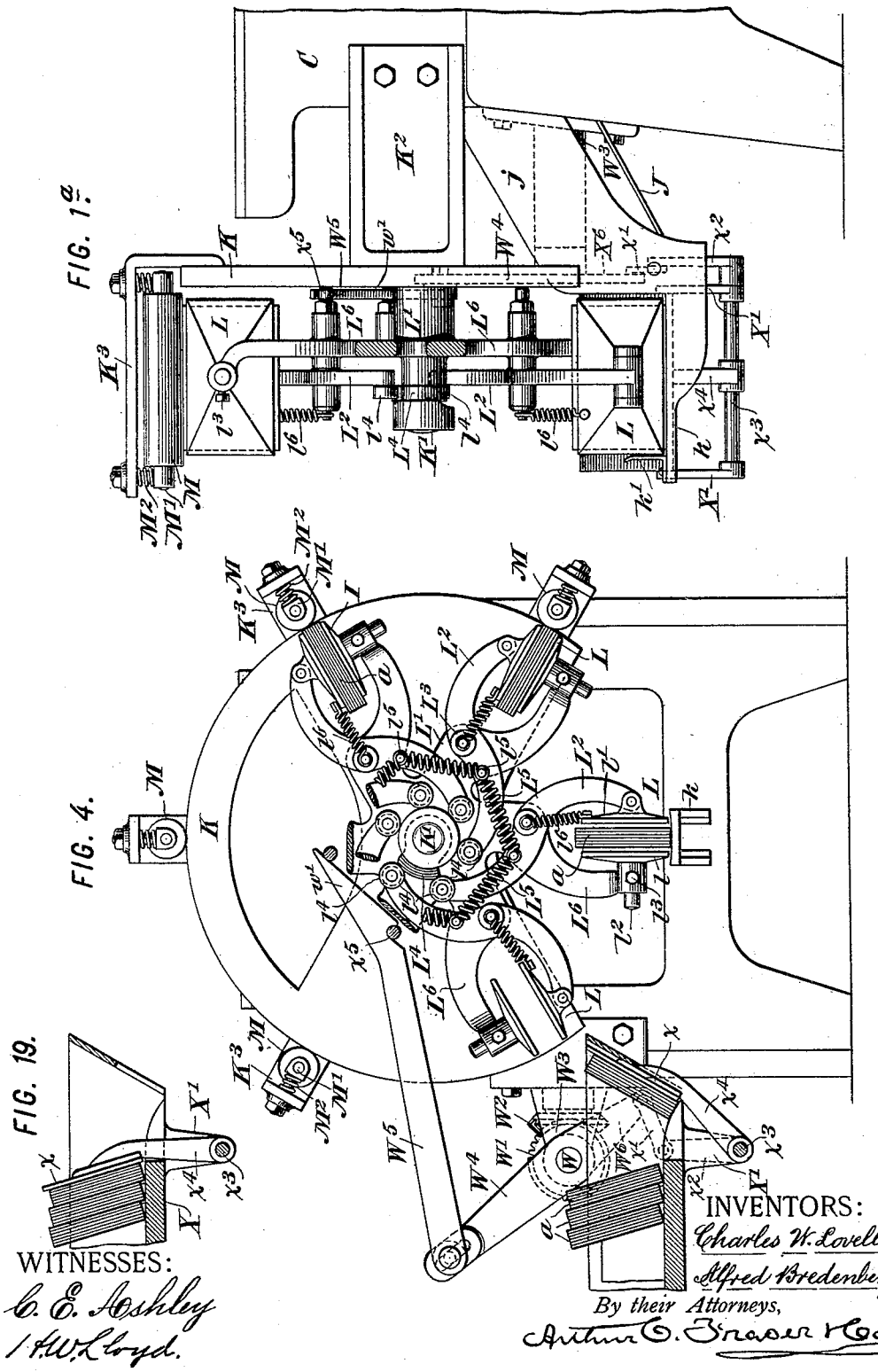
Figure 5:
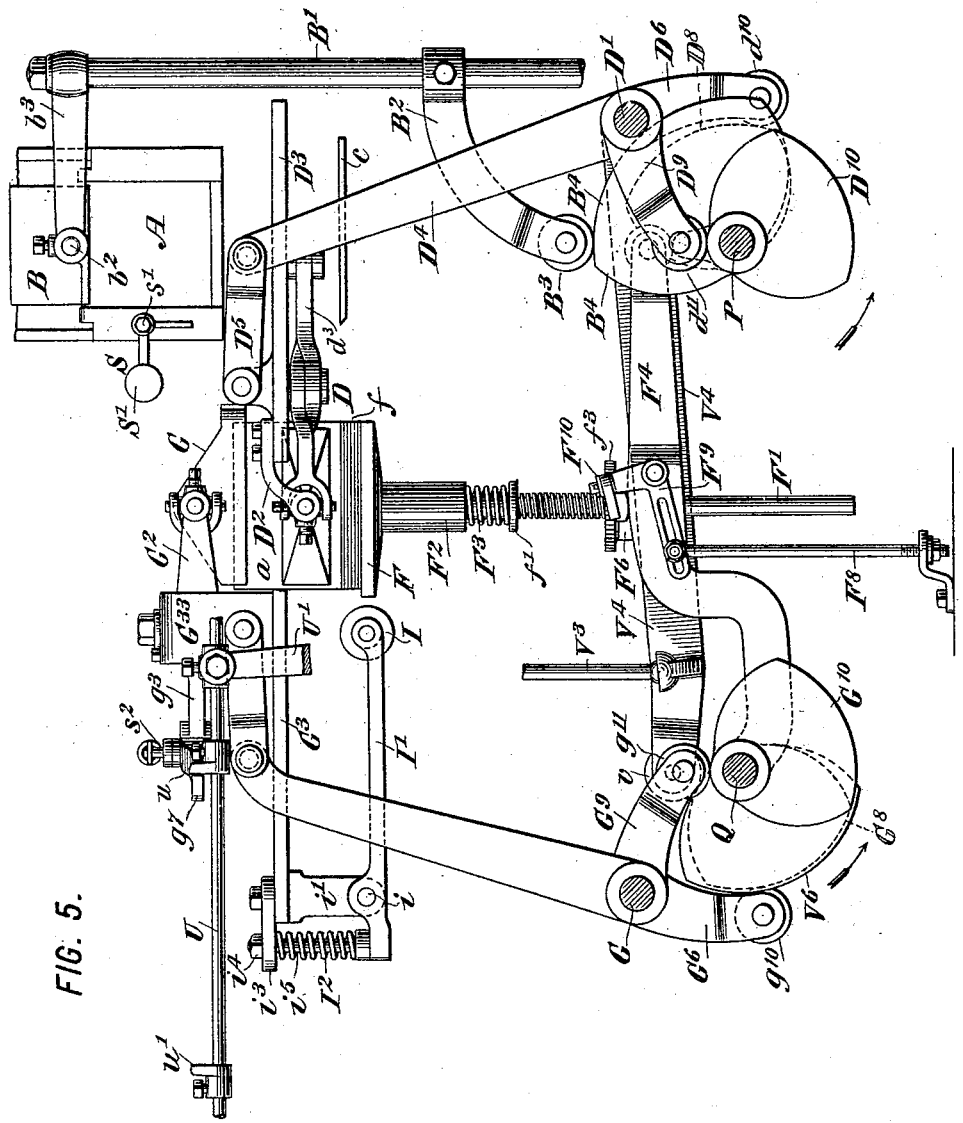
Figure 12:
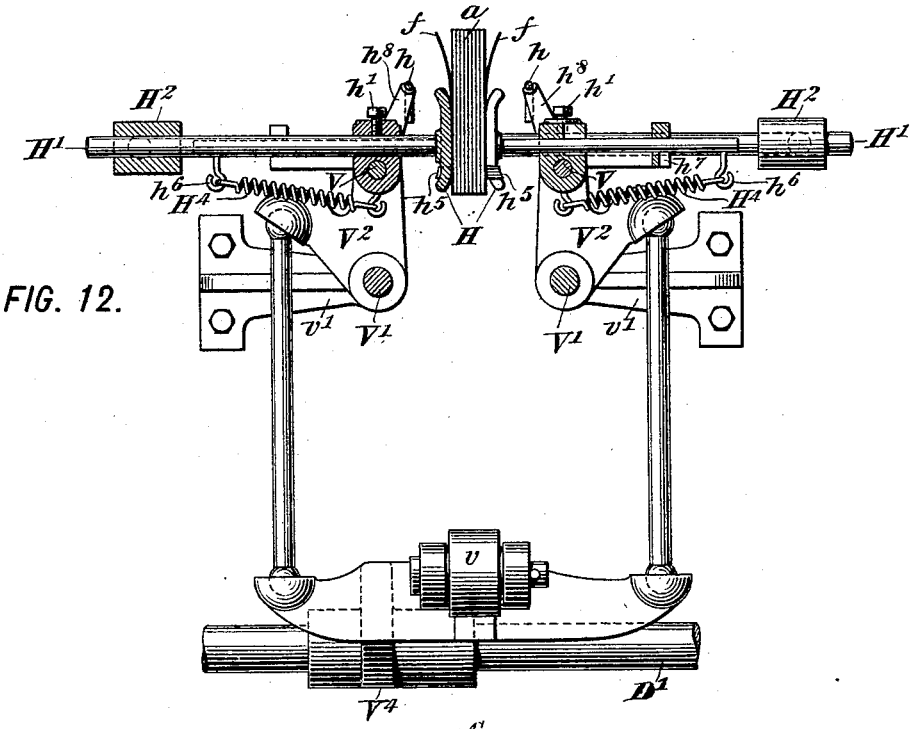
Figure 13:
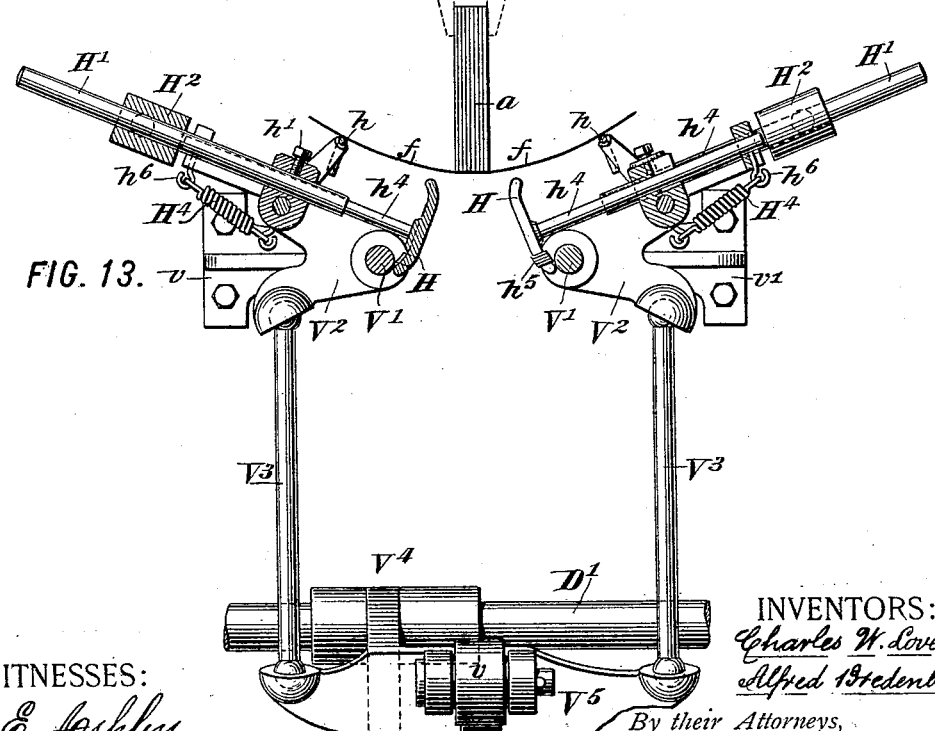

Having now given a general idea of the nature and operation of our invention, we will proceed to describe in detail the specific mechanism which we have devised for carrying our invention into practical operation. This mechanism is illustrated in the accompanying drawings, wherein Figure 1 is a side elevation of our improved machine partly broken away in section, the parts being shown in the position wherein a book has just been fed to the primary book holding clamps and the preceding book has just been operated upon by the book folder. The left hand end of the machine, comprising the drying and back rubbing mechanism, not shown in this figure, is shown in Fig 1ª, which is a continuation of Fig. 1. Fig. 2 is a plan view of the machine with the exception of the drying mechanism, which is omitted. Fig. 3 is an end view of the machine in transverse section cut on the line 3—3 in Figs. 1 and 2 and drawn to larger scale. Fig. 4 is an end elevation of the machine showing the drying and back rubbing mechanism and delivering mechanism, part of the latter being shown in vertical section. The drying mechanism is partly broken away. Fig. 5 is a side view of certain of the operative parts, the frame and other portions of the machine being omitted for greater clearness. The parts are shown in the second stopping position of the book at the instant of applying the cover. Fig. 6 is a vertical longitudinal mid-section of the machine. Fig. 7 is a horizontal section through the main portion of the machine cut on the line 7—7 in Figs. 1, 3, and 9. Fig. 8 is a plan of the primary and secondary book holding clamps and carriers, the gummer and the cover-applying table with its gages, all other parts being omitted and the frame of the machine being shown in dotted lines. Fig. 9 is a vertical transverse section on the same scale as Fig. 3 cut in the plane of the line 9—9 in Figs. 1 and 2. Fig. 10 is a plan of the cover folding mechanism, the main frame of the machine being shown partly in fragmentary horizontal section. Fig. 11 is a sectional side view of the cover folders in section on the line 11—11 in Fig. 10. Fig. 12 is a transverse section of the cover folders in the planes indicated by the line 12—12 in Fig. 10. In Figs. 10, 11 and 12 the cover folders are shown elevated in their position after folding the covers and while clamping the book. Fig. 13 is a similar view to Fig. 12, except that the folders are shown in their opposite position before rising to perform the folding operation. Fig. 14 is a plan view of the working parts of the primary book clamp separated, and Fig. 15 is an end elevation of the clamping and toggle levers. Fig. 16 is a transverse section of the feed chute. Fig. 17 is a longitudinal section thereof. Fig. 18 is an enlarged transverse section of the ratchet feed-nut for feeding up the cover-applying table. Fig. 19 is a fragmentary section of the book delivery table showing the parts in a different position from Fig. 4. Fig. 20 is a diagrammatic view illustrative of the progress of the books through the machine, and showing the positions of the successive clamps and other operating parts. Figs. 21 to 29 inclusive are a series of fragmentary diagrammatic views illustrating the successive operations performed by the machine upon the book, the views looking toward the end of the book, and from the delivery end of the machine.

We will first describe with reference to Figs. 20, and 21 to 29, the successive operations that are performed upon the book, and the operative parts which immediately act upon the book and cover to perform these operations.

Figure 21:
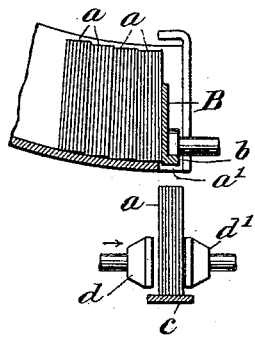
Figure 22:
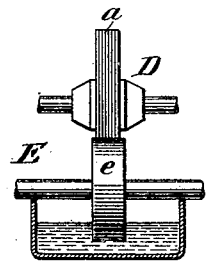
Figure 23:
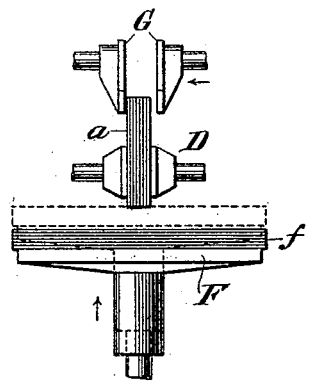
Figure 24:
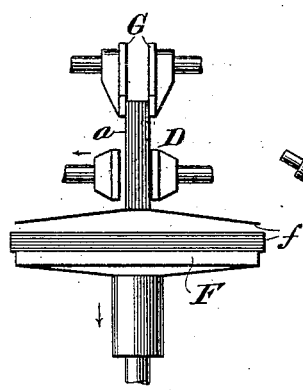
Figure 25:
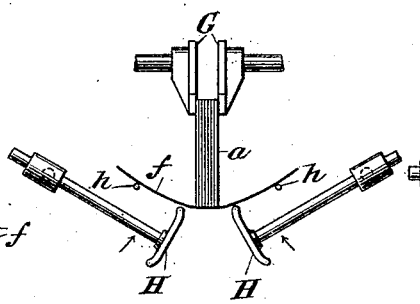
Figure 26:
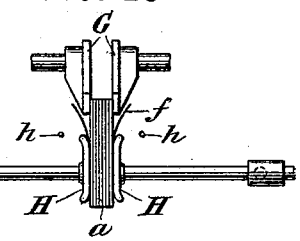
Figure 27:
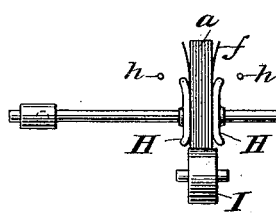
Figure 28:
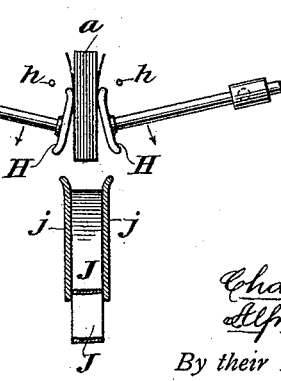
Figure 29:
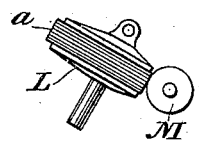

Referring to Fig. 21, the respective books $a$ $a$ to be covered are placed back downward in an inclined trough or chute A, the lower end of which has a bottomless portion $a'$ wide enough to admit one book to pass downwardly. A vertical reciprocating book-feeding pusher or plunger B moves upwardly above the books, which thereupon slide down to the end of the chute, the end book standing over the open bottom $a'$. As the book pusher B descends, its bottom plate $b$ strikes the upper edge of the book and pushes it down through the open bottom and out of the chute, the book dropping onto a gage plate $c$ and between the open clamping jaws or plates $d\ d'$ of a primary book holder or clamp D. The clamp D then closes upon the book, gripping it firmly, and moves, carrying the book to the position 2 in Fig. 20. In so doing it carries the book over a gummer E (Figs. 20 and 22) shown as consisting of a vessel containing glue or other adhesive material, and in which revolves a roller $e$ by which the glue is carried up and applied to the back of the book as the latter is carried over and in contact with it. This gumming operation is shown in Fig. 22, and in dotted lines in Fig. 20. The clamp D stops with the book in the second position, where it stands over the cover-applier F, consisting of a flat plate or table on which are placed one or more covers $f$. While the clamp D holds the book in the second position, the cover-applier F ascends and presses the middle of the topmost cover against the gummed back of the book, and then descends leaving the topmost cover adhering to the book back. The cover-applier is shown ascending in Fig. 23, and descending in Fig. 24. Either before or after the cover is applied, the jaws of a secondary clamp G arranged above the primary clamp D, close upon and tightly grasp the book. This clamp is shown in the act of closing in Fig. 23. Subsequently to the applying of the cover, the primary clamp D opens and releases the book, being shown in the act of opening in Fig. 24. The secondary clamp G then executes a forward movement, carrying the book from the position marked 2 in Fig. 20 to the third position marked 3. In this movement the cover in its flat or unfolded condition is carried along with the book. In position No. 3 the book arrives over the cover folders H as shown in Fig. 25. In moving to this position the projecting side portions or flaps of the cover $f$ slide over guide rods or wires $h\ h$, whereby they are held up and prevented from dropping down to interfere with the cover folding mechanism. While the book is held stationary by the clamp G in this third position, the cover folders H move or swing upwardly and inwardly from the position shown in Fig. 25 to that shown in Fig. 26, thereby folding or bending the sides of the cover upwardly against the sides of the book and tightly stretching the cover over the back of the book. As the cover folder reaches the latter position, its folding plates will have firmly clamped the book and its cover between them, and they then temporarily hold it there. Thereupon the secondary clamp G opens and releases the book, moving thereupon back to the second position to grasp the next succeeding book. The book is then held solely by being clamped between the cover folding plates H, as shown in Fig. 27. A back roller I rolls longitudinally beneath the back of the book while thus held, serving to press or rub the cover into more intimate union with the gummed back of the book. This operation is shown in Fig. 27, the roller I being shown in its positions before and after operation in Fig. 20. The cover folders then move downward and outward to their original position, thus starting the book downward as shown in Fig. 28, and then releasing it and permitting it to drop onto a conveyer J, consisting of an endless traveling belt or apron on which the back of the book rests, and which by frictional contact carries it forward while the sides of the book are held upright between stationary side walls or plates $j\ j$. The book is thus carried to its fourth position, being discharged upon a table $k$ (Fig. 20) and between the jaws or clamping plates of a clamp L. This clamp closes upon and grasps the covered book, and then executes successive step by step movements, holding the book for a sufficient time to enable its gummed back to dry. In its successive movements the back of the book is carried past stationary spring-pressed rollers M, one of which is shown in Fig. 29, whereby these rollers roll across the book back and rub or press down the cover against the book back, thereby perfecting its union therewith. Finally the clamp L opens in such position that the book may drop or slide out and be discharged.

We will now proceed to describe in detail the construction and arrangement of the several parts of our improved machine, referring for that purpose to the several figures of the drawings.

C is the frame of the machine, preferably made of metal, although it may be made of other materials.

N is a shaft to which the main driving wheel is attached, as shown in Fig. 2. For driving the machine by power, a belt or other means of conveying motion to this driving shaft may be used. On the driving shaft N is fixed a pinion $n$ which meshes with a large gear-wheel $p$, which in turn gears into an idler $o$, and the idler gears into another wheel $q$ toward the rear of the machine. The idler is employed simply to transmit power to the wheel $q$. The gear-wheel $p$ is keyed on a shaft P extending across the machine, which we will denominate the primary cam-shaft. The gear-wheel $q$ is keyed on another shaft Q, likewise extending across the machine, which we will denominate the secondary cam-shaft. The idler gear $o$ rotates on a shaft or stud $o'$.

D' and G' are two rock-shafts extending across the machine. All of these shafts P, Q, D' and G' turn in suitable bearings supported by the frame C; they may be located wherever experience may dictate.

Referring now to the book feeder, the book chute or trough A is so shaped that the stack of books resting against one another flatwise and sliding on their backs on the bottom of the chute, slide by their own weight downwardly so that the advancing or end book $a$ is pressed against the delivery end of the chute, standing over the bottom opening $a'$. The chute is curved upwardly from a nearly horizontal position at the delivery end sufficiently to accomplish this result. To accommodate different sizes of books, one side A' of the chute is made adjustable by means of slotted ears $a^2$ projecting from the bottom of the chute, through which ears project set-bolts provided with thumb-screws $a^3$ on their ends, as shown best in Figs. 16 and 17. At the delivery end of the chute are two plates or stop flanges $A^2 A^2$ to prevent the end book from falling out therefrom. The horizontal extensions $A^3$ of these stop flanges overhang the books to prevent the feeding plunger from lifting the end book during its upward movement. The book feeding pusher or plunger B is constructed with a bottom $b$ and a vertical wall $b'$, formed in the construction shown of a bent plate. It is mounted on a horizontal rod $b^2$ (Fig. 9) carried by an arm $b^3$ extending horizontally from the upper end of a vertical rod B' sliding in bearings C' C' attached to the frame C. The vertical rod B' has also an arm $B^2$ rigidly attached to it which carries at its end a roller $B^3$ which rolls upon and is actuated by a cam $B^4$ keyed to the primary cam-shaft P. By means of this cam the sliding rod B' is alternately raised and permitted to descend to feed a book to the primary book holding clamp.

Referring now to the primary book clamping device shown best in Figs. 5, 6, 8, 14 and 15, the clamping jaws or plates $d$ or $d'$ of the clamp D are each attached to the inner end of a rod $d^2$; these rods $d^2$ slide in bearings $D^2$ attached to the carrier $D^3$ for the primary clamp. This carrier, best shown in Fig. 8, consists of a frame or carriage sliding in ways on the main frame C, as shown in Fig. 9. Referring especially to Figs. 8, 14 and 15, let $d^3$ designate two pivoted clamp carrying arms turning on a pivot $d^4$, and connected at their rear ends by a slotted plate $d^5$ and toggle arms $d^6$ $d^7$, the latter arm being extended to engage with a tripping device or tappet to be hereinafter described. The forward ends of the clamp carrying levers $d^3$ engage with the sliding rods $d^2$ by means of collars $d^8 d^8$ fastened thereon by setscrews. $d^9$ is a setscrew whereby we center the clamping jaws, one of them only having motion, the other being fixed by the setscrew $d^9$. This device we apply to all the clamps, and we otherwise arrange the machine so that we can secure adjustment of all its parts relative to a medial line. A spring $s$ is applied to the clamp carrying levers $d^3$ to draw them together and close the clamping jaws upon the book, the opening of the jaws being effected by the straightening out of the toggles $d^6 d^7$ by the tappet device hereinafter described.

It being understood that the primary book clamp D is carried by the clamp carrier or slide $D^3$, we will now describe the mechanism which actuates this carrier, referring especially to Figs. 1, 2, 5, 6, 7, 8 and 9. On the cam shaft D' are keyed two lever arms $D^4 D^4$ at opposite sides of the machine. $D^5 D^5$ are links connecting the upper ends of the levers $D^4 D^4$ with the sliding frame or carrier $D^3$ of the primary clamp. $D^6$ is an arm also keyed to the shaft D' and having a roller $d^{10}$ at its end which engages with the surface of a cam $D^8$ fixed on the cam-shaft P. $D^9$ is another arm keyed to the shaft D' and having a roller $d^{11}$ at its end which engages with a cam $D^{10}$ also keyed to the shaft P. By means of the cams $D^8 D^{10}$ successively alternate rocking movements are imparted to the shaft D' vibrating the lever arms $D^4$ and causing the carrier $D^3$ to slide back and forth to carry the primary book holding clamp D between the first and second positions of the book.

The opening and closing of the book clamp is effected by the following mechanism. A tripping device is provided consisting of dogs or tappets $r$ $r'$ set on a tappet-rod R, which slides in bearings on the frame of the machine. The rod R is actuated by a lever R', shown best in dotted lines in Fig. 6. This lever R' is pivoted at $R^2$ to the frame of the machine, and has a roller $R^3$ at its lower end which engages with a cam $R^4$ (see Figs. 7 and 9) on the primary cam shaft D'. By the action of this cam, and the counter action of a spring $R^5$, the tappet-rod R is given quick sliding motions in opposite directions alternated by long periods of rest. When the book feeding plunger B has dropped a book between the jaws of the primary clamp D, and before the primary carrier $D^3$ commences to move, the tappet-rod R moves quickly toward the left in Fig. 6, so that the tappet $r$ strikes the projecting arm $d^7$ of the toggle by which the clamp levers $d^3$ $d^3$ are held open, and throws the toggle from the position shown in Fig. 14 to that shown in Fig. 8, thereby permitting the spring $s$ to close the clamping jaws upon the book. The carrier then moves, carrying the book to the second position, and at the proper time the tappet-rod R moves in the contrary direction to bring its tappet $r'$ to act upon the toggle arm $d^7$ and straighten it out again to the position shown in Fig. 14, whereby the rear ends of the levers $d^3$ are forced apart, thereby opening the clamping jaws or plates $d$ $d'$ and releasing the book.

The correct position of the book relatively to the jaws of the primary clamp is determined by the following described gaging devices. $c$ is a plate or table underneath the first pair of clamping jaws on which the book drops and by which it is supported until grasped by the jaws. This plate constitutes a back gage which determines the proper projection of the back of the book beyond the jaws of the primary clamp. S is a bell crank lever pivoted at $s'$ and provided with a weight S' on its upper arm; it has also a curved or half-moon shaped push-plate $S^2$ attached to its lower end. This plate is so located on the end of the downwardly extending arm of the bell crank lever S, that it shall always engage with the forward end of the book just fed to the primary clamp. The purpose of this part of the apparatus is that the book as fed, and prior to being clamped by the primary clamping apparatus, shall be pressed back by the push-plate $S^2$ against a plate $c'$ which is attached to the forward side of the clamp frame or carrier $D^3$, whereby the book will be properly adjusted or registered endwise relative to the first clamping jaws, and being thus once properly started on its passage through the machine, will thereafter continue in proper relations. The plate $c'$ hence constitutes an end gage.

Referring now to the gumming device E, shown best in Figs. 1, 6 and 8, E' is an ordinary glue-pot, preferably a double bottomed one, whereby hot water or steam may be employed to heat the glue. $e$ is a glue roller revolving in the pot. It is made adjustable up and down as may be desired by its shaft being hung on a pivoted bracket $e'$ provided with a screw, whereby the elevation of the glue roller may be adjusted. $E^2$ is a belt which runs over a pulley $E^3$ on the primary cam-shaft P; it also passes over a pulley on the shaft of the glue roller. By this means the glue roller is rotated irrespective of the frictional contact of the book with it. This glue roller is set in the medial line of the machine.

Referring now to the mechanism for applying the covers, F' is a vertical rod or bar which has a cover supporting plate F mounted on its upper end. This plate has a hub $F^2$ on its under side which receives the upper end of the rod F' within it, and which is supported on a stiff spring $F^3$, which rests on a supporting collar $f'$ fast on the rod F'. $F^4$ is a lever fulcrumed on the secondary cam shaft Q (Figs. 6 and 7); it has a roller $f^2$ at its forward end which engages with a cam $F^5$ keyed to the primary cam-shaft P, by means of which once in each revolution the lever $F^4$ is raised and lowered. The lever $F^4$ is bisected and supports above it a ratchet-wheel $f^3$, by means of an intervening sleeve $F^6$ having lateral studs or ears $f^4$ overlying the lever $F^4$, as shown in Fig. 18. A hub on the ratchet-wheel $f^3$ turns within the sleeves $F^6$, and is internally threaded constituting a nut $F^7$, its threads engaging with external screw threads on the vertical rod F'. $F^8$ (see Figs. 6 and 5) is a rod rigidly attached to the floor or to some rigid part of the machine as preferred. $F^9$ is a bell crank lever pivoted at $f^5$ to the lever $F^4$. The horizontal arm of the bell crank lever $F^9$ is slotted; the upright arm of the lever $F^9$ has a pawl $F^{10}$ jointed to it which engages with the ratchet-wheel $f^3$. The upward movement of the lever $F^4$, actuating, through the rod $F^8$, the lever $F^9$ and pawl $F^{10}$, turns the ratchet-wheel $f^3$, and its threads, engaging the non-rotative rod F', screw it upward slightly, thereby feeding the cover supporting plate upwardly to compensate for the thickness of the cover which is removed by its attachment to the book.

In order that the covers may be always presented to the book in proper location so that the printing upon the back of the covers will come squarely upon the back of the book, and also that the corners of the covers may accurately coincide with the corners of the book, we provide cover registering devices as follows:—T is a vertical plate fastened to the frame of the machine adjacent to one of the edges of the cover supporting plate F. T' T' are two lateral plates adjustable toward and from the medial line of the machine by set-screws $T^2$ (see Fig. 1) which work in slots made in the right-angled pieces of the plates T'. By means of the proper adjustment of these plates, as well understood, the covers can be accurately located upon the supporting plate F whatever their width or length may be. $t$ is a pin fastened to some suitable immovable part of the frame C, which during the depressed or retracted position of the cover supporting plate F rests in front of the covers and prevents their displacement in that direction consequent on jar or the like. It is adjustable by means of a clamp-screw $t'$.

Referring now to the second book holder or clamp G, and having special reference to Figs. 1, 2, 6 and 8:—this clamping device is of substantially the same construction as the clamp D, already described. It has fixed and movable clamping jaws or plates $g\ g'$ mounted on rods $g^2$ having bearings in brackets $G^2$ projecting from a sliding frame or carrier $G^3$, movable like the carrier $D^3$ in ways on the fixed frame of the machine, with the exception, however, that the secondary carrier is made with a yoke projecting upwardly as shown at $G^{33}$ (Figs. 1, 2 and 3). The clamping jaws are operated by levers $g^3\ g^3$ pivoted to the cross yoke $G^{33}$, drawn together to close the clamp by a spring $s^2$, and forced apart to open the clamp by toggles $g^6\ g^7$ similar to the toggles first described but reversed in position. The projecting arm of the toggle lever $g^7$ is operated by tappets of the same construction as those already described for operating the toggles of the primary clamp. These tappets are lettered $u\ u'$, and their tappet rod is letter U. As shown in Figs. 1, 2 and 3, it is mounted at the opposite side and end of the machine from the tappet-rod R, and is worked by a lever $U'$ pivoted to the frame at $U^2$, and having its lower arm extending over the cam-shaft Q, and carrying a roller $U^3$ acted on by a cam $U^4$ on said shaft, best shown in Fig. 1. A spring $U^5$ acts on the lever against said cam. When the secondary clamp G reaches the middle or book covering position, as shown in Fig. 5, the tappet-rod U is moved toward the left in Fig. 1, so that the tappet $u$ strikes the toggle arm $g^7$ and trips the clamp, permitting its spring $s^2$ to close its jaws on the book. When the clamp reaches the third or book covering position, as shown in Figs. 1, 2 and 8, the tappet-rod moves toward the right, and its tappet $u'$ engages the toggle arm $g^7$ and straightens the toggle, thereby forcing the clamp levers apart and opening the clamp.

The secondary carrier or slide $G^3$ is reciprocated in the same manner as the primary carrier by the following described mechanism. $G^4\ G^4$ are levers which are substantially the same in all respects, and have substantially the same coacting parts as the levers $D^4$ heretofore described, that is to say, they are fixed on the shaft $G'$ and have arms $G^6$ and $G^9$ on said shaft provided with rollers $g^{10}\ g^{11}$, which engage with cams $G^8\ G^{10}$ on the cam-shaft Q, said cams being the same as those on the primary cam-shaft for imparting like movements. Each arm $G^4$ has also a link $G^5$ which is pivoted to the sliding frame $G^3$ for the second set of clamps.

We will now describe the cover folders and their operating mechanism. Referring to Figs. 10, 11, 12 and 13 more particularly, the parts being also shown in Figs. 1, 2 and 3, $H'$ is a rod which slides in an oscillating bearing $H^2$ set on the side frame of the machine; to it is rigidly fastened by a set-screw $h'$ a frame $H^3$ comprising a cross-bar $h^2$ (Fig. 10) and two laterally projecting bracket-like arms $h^3\ h^3$ cast integrally with the cross-bar. A shaft V passes through a hole in the lower part of the cross-bar $h^2$, and two rods $h^4\ h^4$ slide through holes made in this cross-bar and in the extremities of the arms $h^3$; these rods have fixed on their ends one of the cover folding clamp plates H. The upper edges of these plates are beveled off, as shown in Figs. 12 and 13, to allow of easy sliding action upon the covers of the book, as hereinafter explained; $h^5$ are pieces of rubber or their equivalent which are fixed in the faces of the clamp plates H, whereby friction is applied to the covers to draw them up snugly around the book and over its back in the manner hereinafter described. $H^4\ H^4$ are springs fastened each at one end to the frame $H^3$, as shown in Figs. 12 and 13, and at the other end to pins $h^6$ which enter fixedly the rods $h^4$, playing through slots $h^7$ made in the arm $h^3$, whereby the rods and the clamp plates H are normally pressed forward toward the medial line of the machine. $h$ is a rod supported on brackets $h^8\ h^8$, which rod as the book and its cover are carried forward by the secondary clamps as hereinafter described, guides the loose side of the cover, properly presenting it to the cover folding clamp H for folding it up on the side of the book. It will of course be understood that the parts just described are duplicated on both sides of the machine. $V^4$ (see Figs. 5, 6 and 7) is a lever fulcrumed on the shaft $D'$, having a cross-head like part $V^5$ near its free end (as shown in Figs. 7 and 12) and provided at its free end with a roller $v$, which engages with the surface of a cam $V^6$ on the secondary cam-shaft Q. $V^3\ V^3$ (see Figs. 6 and 12) are double headed rods which are stepped at their lower ends in sockets made in the cross-head like part $V^5$ of the lever $V^4$, and which at their upper ends are stepped into like sockets on the under side of the lower arms of two bell cranks $V^2\ V^2$ (see Figs. 12 and 13). Each of these bell cranks $V^2$ is fast on a shaft $V'$, which turns in bearings formed in the ends of two brackets $v'\ v'$; on the same shafts are also fixed corresponding lever arms $V^{20}\ V^{20}$. The upper ends of the bell crank levers $V^2\ V^2$, and of these arms $V^{20}\ V^{20}$, have rigidly fastened therein the cross shaft V already referred to; thus the bell crank lever $V^2$, shaft $V'$, arm $V^{20}$, and shaft V, are all rigidly attached to each other, the entire structure turning on journals at the ends of the shaft $V'$ supported by the brackets $v'$ before explained. In operation the lifting of the lever $V^4$ by the cam $V^6$ operates the bell cranks $V^2$ and their coacting parts, swinging them from the position shown in Fig. 13 upwardly and toward the medial line of the machine to the position shown in Fig. 12. In this movement the cover folding plates H H swing upward and toward the middle until they come in contact with the book which arrests their motion toward each other, and during the remainder of the movement the rods $h^4$ slide through the frame $H^3$, their springs $H^4$ being distended while the plates H H execute a sliding movement vertically upward against the sides of the book. When the lever $V^4$ has reached its most elevated position, the plates H H will have firmly clamped the book and its cover between them, and they then temporarily hold it there.

Referring now to the next feature of our invention, which consists in a roller which rolls over the back of the book after the cover has been applied and gives it its primary rubbing down or compression for the purpose of increasing the adhesion: I (see Figs. 5, 6 and 3) is a roller set in a bifurcated lever I', which is fulcrumed at $i$ to a bracket $i'$ fastened in any preferred manner to the sliding carriage $D^3$ of the secondary clamps. The lever I' extends rearwardly beyond the fulcrum $i$, and is normally depressed by a corresponding spiral or other suitable spring $I^2$, which is supported at its upper end by a bracket $i^3$ attached to the sliding carriage. By the action of this spring the forward end of the lever I' which carries the roller I is normally pressed upward. The vertical adjustment of this roller is attained by a set-nut $i^4$ threaded to the upper end of a screw-rod $i^5$, which passes through the spiral compressing spring $I^2$, and through the bracket $i^3$, which being set up or turned back as desired, will determine or limit the upward movement of the rubbing roller I. The roller I acts upon the book while the latter is held between the cover folding clamp plates H H, since, being carried by the sliding carrier $D^3$ of the secondary clamp, it moves with this clamp, and consequently rolls the back of the book during the return movement of the clamp from the third to the second position of the book.

We will refer now to the conveyer or delivery chute and coacting parts whereby the books after having the covers attached to them are automatically delivered to a drier constructed with what we denominate a star wheel attachment at the extreme rear of the machine. The chute consists of sides $jj$ made of metal or of wood as desired, between which travels a belt J which passes over pulleys J' J', one of which is driven by a belt $J^2$, which passes over a pulley $J^3$ on the secondary cam-shaft Q. The book is dropped upon the conveyer belt J by the downward retractile movement of the clamping plates H H of the cover folder, the book falling between the opposite members of the bifurcated lever I' (Fig. 28). The books conveyed by the belt J are delivered upon the table $k$ against a stop $k'$ at the rear edge of this table (Fig. 1$^a$) which prevents the book from passing too far out. This entire apparatus is so timed that the belt J will deliver a book upon the table $k$ contemporaneously with the presence of one of the successive pairs of clamping plates of the star wheel drier, as hereinafter explained.

The drying apparatus, or star wheel so called, for rubbing down, drying and securing permanent and smooth attachment between the covers and the books, will now be described with special reference to Figs. 1$^a$ and 4. The drier consists of a successive series of book holding clamps L L mounted to revolve about a common center, and moved intermittently to grasp and carry the successive books; each clamp L consists of two clamping plates or jaws $l\ l'$, the former being fixedly attached to the clamp carrier, and the latter being movable toward and from the plate $l$ to close and open the clamps. L' is a clamp carrier or casting which turns on a rigid stud or axis K'. The clamp carrier or casting L' is formed with radially projecting arms $L^6\ L^6$, to the ends whereof are attached the clamping plates $l\ l$, the latter being formed on studs or bars $l^2$, which are adjustable by means of set-screws $l^3$. $L^2\ L^2$ are arms or levers pivoted to the casting L' by pivots $L^3$. These levers have attached at their outer ends the plates $l'\ l'$ constituting the other halves of the clamps L L, and at their inner ends they have each a roller $l^4$. These rollers roll around a stationary cam $L^4$ keyed on the rigid stud or axis K', being pressed against said cam by springs $L^5\ L^5$ connected between studs $l^5\ l^5$ on the respective levers $L^2\ L^2$, whereby they are given a clamping or holding action upon the book. $l^6\ l^6$ are springs which draw against the pivoted clamping plates $l'\ l'$ to balance them and cause them to be properly presented for the reception of the books. The star wheel is carried by a circular frame K bolted rigidly to the end of the frame C by connecting frames $K^2$. From the center of this circular frame projects the rigid stationary stud K' around which the star wheel turns.

The intermittent rotation of the star wheel is imparted by the following described mechanism:—The shaft G' (see Fig. 7) receives an intermittent rocking motion by reason of the action of the arms $G^6\ G^9$ engaging with their respective cams upon the secondary cam-shaft Q as already described, and this shaft G' has at one side of the machine a miter-gear $W^2$ keyed to it, which meshes into another miter-gear W' keyed to the end of a shaft W, which turns in a bearing $W^3$ bolted to the frame of the machine. At the other end of the shaft W (see Fig. 4) there is keyed a lever $W^4$ which has pivoted to its upper end a pitman $W^5$, the connection between the lever and pitman being preferably an adjustable one as shown; the forward end of this pitman projects upwardly in the form of a finger and has adjacent to the end a hook-shaped part $w'$, which at each oscillation of the shafts G' and W rises up over and hooks on one of a series of pins $w$, which pins are extensions of the pivots $L^3$ for the movable clamp levers $L^2$. The adjustment of the parts of the star wheel drier is such that as the clamp carrier $L'$ is rotated by the pitman $W^5$, the roller $l^4$ of the lever $L^2$ of the lower clamp L standing over the table $k$, drops from the projecting portion of the cam $L^4$, thereby causing the movable clamping plate $l'$ of said clamp under the tension of the springs $L^5$ to grasp the book between itself and its counterpart clamping plate $l$. To the outer edge of the circular frame K are bolted brackets $K^3 K^3$, four in number, that support on their inner sides rollers M M, which rollers are faced with some suitable elastic material such as rubber, ink roller composition, or the like, the rollers being supported and turning in journal boxes $M'$ preferably provided with compression springs $M^2$. Each of the clamps L after gripping the book, carries it around by a step by step movement under the several compression rollers M, which roll across the back of the book, firmly pressing the cover into contact therewith.

The delivery of the book is effected by the following described mechanism:—$W^6$ (Fig. 4) is an extended part of the lever $W^5$ which engages with a link $x'$, which is pivoted to an arm $x^2$ keyed on a shaft $x^3$, which is hung in a downwardly extending bracket $X'$. To the shaft $x^3$ is keyed an upwardly extending arm $x^4$ having fixed to its upper extremity a pusher plate $x$. X is a table projecting laterally for the reception of the covered books as delivered from the machine. As each clamp L moves from the fourth roller M to the delivery position, it is opened by the roller $l^4$ of its lever $L^2$ rolling up the projection of the cam $L^4$, whereby the book is released while the clamp stands at a downward inclination, and the book consequently slides out onto the plate $x$, which thereupon moves to the position shown in Fig. 19, thereby pushing the book along on the table against the stack of preceding books.

The operation of the machine in all its parts is as follows:—The books are fed by an attendant down the chute A, they resting upon their backs and sliding down by their own weight. The machine being started, the feed-rod $B'$ is by the operation of the devices hereinbefore described intermittently and automatically elevated, carrying the plunger B upward. Thereupon the book which is next to the end plates $A^2 A^2$ slides under the bottom flange $b$ of the feeder. Upon the downward movement of the rod $B'$, this flange $b$ presses upon the upwardly presented edges of the leaves of the book and presses it down, deflecting the semi-circular push-plate in its course, and thereby lifting the weight $S'$, which acts to press the end of the book against the gage $c'$. The book drops upon the gage plate $c$, and between the plates $d\ d'$ of the primary clamp D. This clamp is then tripped by means of the tappet $r$ on the tappet-rod R actuated as before described, striking the extended arm $d^7$ of the toggle lever, which allows the spring $s$ to act upon the clamping levers, and causing the clamping plates to close firmly upon the book, holding it rigidly between them. The clamp carrier $D^2$ is then actuated by the arms $D^4$ as already described, and the primary clamping apparatus is thus slid forward carrying the book with it. The back of the book in its movement is brought in contact with the glue roller $e$, which is properly adjusted to supply glue to the back of the book. The book continues its forward movement held by the clamp D until it rests over the book covers $f$ on the cover-applying plate F, which supports them. The books rest there for a moment, during which the lever $F^4$ is lifted by the action of the cam $F^5$ on the primary cam shaft as before stated, which carries the plate F and the covers upwardly, as shown in Fig. 5, and the uppermost cover is firmly pressed against the glued back of the book. This upward movement of the lever $F^4$, acting through the pawl and ratchet as described, feeds the cover-supporting plate F upwardly to compensate for the thickness of the cover, which is removed by its attachment to the book. While the primary clamp is moving forwardly carrying the book over the gumming or gluing device, the secondary clamp G is moving in the opposite direction, so that the two clamps meet during the time that the cover is being pressed upon the back of the book by the operation of the plate F as already stated, and the secondary clamp by an operation in all respects the same as that already described in relation to the primary clamp, is then tripped and closes upon the book, gripping it at the upper half of its width, the primary clamp having hold of it at the lower half, and by the time that the cover has been attached to the back of the book, or shortly thereafter, the clamp D is operated by means of the tappet $r'$ on the rod R striking against the toggle lever of the clamp, so that the primary clamp is opened and releases its hold on the book. Then while the primary clamp returns to its initial position, the secondary clamp, which then holds the book, carries it forward by the movement of the clamp carrier $G^3$, thus carrying the book with the cover which adheres to it by reason of the glue. The book and the cover are carried directly over the cover folding apparatus shown more especially in Figs. 10 to 13, which apparatus is then in its depressed and retracted position, as shown in Fig. 13; the cover guiding rods $h\ h$ during this movement of the book and its cover guide the projecting sides of the cover in such manner as to uphold them above the cover folders, as shown in Fig. 13. Thereupon the lever $V^4$ is lifted by the action of the cam $V^6$, and acting through rods $V^3 V^3$, operates the bell cranks $V^2 V^2$ and the coacting parts as already described, swinging the frames $H^3$ and their cover folding clamp plates H H upwardly and toward the medial line of the machine. By this movement the cover is folded up against the sides of the book and tightly stretched over the back of the book by means of the frictional contact between the rubber or equivalent substance on the faces of the clamping plates H H. When the lever V⁴ has reached its most elevated position, the plates H H will have firmly clamped the book and its cover between them, and they then temporarily hold it there. Thereupon the secondary clamp G is opened by the action of the tappet devices, and its carriage G³ then makes another movement toward the middle of the machine to get the succeeding book, and during its movement the roller I, which is mounted beneath the carriage as stated, rolls hard along the back of the book, pressing the cover into intimate contact therewith, the spring I' giving such tension as may be desired, thus giving the cover firm attachment to the book, and also squaring the corners of the book. As soon as the roller I has passed the book, the clamping plates H H are released by the dropping of the lever V⁴, which allows the various coacting parts to assume such position that the cover folding clamps will again swing downwardly and away from the medial line of the machine. This releases the book and its cover, which instantly drops into the delivery chute $jj$ and upon the conveyer belt J therein, which carries the book as already stated in proper time down upon the table $k$ against the stop $k'$. As before stated one of the sets of clamps L of the star wheel is always presented at the delivery table at the time a book is coming down. As soon as the book has passed between the clamp plates of this clamp the star wheel is rotated one step, whereupon this clamp is closed by the roller $l^4$ thereof rolling off the enlarged diameter of the stationary cam L⁴, causing it to grip the book and carry it around by a step by step movement under the several compressible rollers M M, which roll across the back of the book pressing the cover firmly into contact therewith, the glue drying during all these operations, and by the time the book has been subjected to the action of all the rollers M M and is carried adjacent to the delivery table X, the clamp L is again opened by its roller $l^4$ riding up upon the enlarged diameter of the stationary cam L⁴, whereupon the properly covered book is delivered by sliding out of the clamp, falling in front of the pusher plate $x$, which being actuated as already described, shoves the books out one after another upon the table X ready to be taken away by the operator.

We do not limit ourselves to the details of construction shown and described, because it will be apparent to those skilled in this art that many alterations may be made in the details and yet the essentials of our invention be employed. For example, since our present invention was made, we have departed from the specific construction of cover folder or breaker herein shown and described, and have adopted in lieu thereof substantially the construction of cover folder or breaker invented by Alfred Bredenberg, and claimed in his patent No. 428,741, dated May 27, 1890. In so doing we have omitted the initial back-pressing roller I.

We have also in practice departed from the specific book carrying mechanism herein shown and described, which carries the book by reciprocating clamps gripping it successively, and substituted therefor a book carrying mechanism consisting of a plurality of clamps carried by a traveling carrier or endless chain, the successive clamps grasping the successive books and continuing to hold them during their passage through the machine, releasing them only upon their final delivery therefrom. This construction is described and claimed in our application for patent for book covering machine, filed November 21, 1890, Serial No. 372,191.

We claim as our invention the following defined novel features or combinations, substantially as hereinbefore specified, namely:

1. In a book-covering machine, the combination of a book-holding clamp adapted to hold a book with its back projecting beyond the clamping members, a gummer adapted to apply adhesive material to unite the cover to the book back, and a cover-applier comprising a cover supporting plate arranged relatively to said clamp to hold the middle portion of the cover toward the book-back, and means for pressing the middle of the cover and book-back together.

2. In a book-covering machine, the combination of a book-holding clamp adapted to hold a book with its back projecting beyond the clamping members, a gummer adapted to apply adhesive material to unite the cover to the back of the book, a cover-applier comprising a cover supporting plate arranged relatively to said clamp to hold the middle portion of the cover toward the book-back, and means for pressing the middle of the cover and book-back together, and a cover folder adapted to fold the cover against the sides of the book.

3. In a book-covering machine, the combination of a book-holding clamp adapted to hold a book with its back projecting beyond the clamping members, a gummer adapted to apply adhesive material to unite the cover to the back of the book, a cover-applier comprising a cover supporting plate arranged relatively to said clamp to hold the middle portion of the cover toward the book-back, means for pressing the middle of the cover and book-back together, a cover-folder adapted to fold the cover against the sides of the book, and a presser for subsequently pressing against the book-back to unite the cover more firmly thereto.

4. In a book-covering machine, the combination of a book-carrier comprising a book-holding clamp adapted to hold a book with its back projecting beyond the clamping members, and a carriage for said clamp movable to carry it from a book feeding position to a cover applying position, a driving mechanism constructed to impart said movement to said carrier and to hold it stationary in said cover-applying position, a gummer adapted to apply adhesive material to unite the cover to the book-back, and a cover-applier comprising a cover-supporting plate arranged to hold the middle portion of the cover in coincidence with said book clamp when the latter is in the cover-applying position, and means for pressing the middle of the cover and book-back together.

5. In a book-covering machine, the combination of a book-carrier comprising a book-holding clamp adapted to hold a book with its back projecting beyond the clamping members, and a carriage for said clamp movable to carry it from a book feeding position to a cover applying position, a driving mechanism constructed to impart said movement to said carrier and to hold it stationary in said cover-applying position, a gummer located between said positions and constructed to apply adhesive material to the book-back in transit to unite the cover to the book-back, and a cover-applier comprising a cover supporting plate arranged to hold the middle portion of the cover in coincidence with said book clamp when the latter is in the cover applying position, and means for pressing the middle of the cover against the gummed book-back.

6. In a book-covering machine, the combination of book-carrying mechanism adapted to grasp and carry successive books, having a succession of book-holding clamps each adapted to hold a book with its back projecting beyond the clamping members, and driving mechanism for moving said clamps to advance the books intermittently to successive positions, advancing each book from a feeding position to a cover-applying position, and subsequently to a cover folding position, a gummer constructed to apply adhesive material to the book-back on its way from the feeding to the cover applying position, a cover-applier comprising a cover-supporting plate movable toward the book in the latter position to press the middle of a cover against the gummed book-back, and a cover-folder movable against the book in the cover folding position to fold the cover against the sides of the book.

7. In a book-covering machine, the combination of book-carrying mechanism having a succession of book-holding clamps each adapted to hold a book with its back projecting beyond the clamping members, and means for moving said clamps to carry the successive books to successive stopping positions, a gummer for applying adhesive material to the backs of the books, cover-applying, cover-folding, and back-pressing mechanisms arranged to act in the stationary positions of the successive books, and a driving mechanism for alternately operating said book-carrying mechanism to advance the books and said cover-applying, folding, and pressing mechanisms to operate on the books in their stationary positions.

8. In a book-covering machine, the combination with a gummer, a cover-applier, a cover-folder and back-pressers, of book-carrying mechanism having a series of book-holding clamps each adapted to hold a book with its back projecting beyond the clamping members, and means for moving said clamps to carry the books to successive stopping positions, said clamps exceeding in number said cover-applying and folding mechanisms, and said mechanisms being arranged to act in the stopping positions first occupied by the books, a driving mechanism for alternately operating said book-carrying mechanism to advance the books and said cover-applying, folding, and pressing mechanisms for operating upon the books in their stopping positions, and means for discharging the covered books arranged to act at the end of a series of successive movements subsequent to the final covering operation, whereby during the movements subsequent to the covering operations the books are carried and given time for the adhesive material to partially dry before being discharged.

9. In a book-covering machine, the combination of a book-carrier comprising a book-holding clamp having two opposite clamping plates adapted to grasp the sides of a book between them with its back portion exposed and projecting beyond said plates, and a carrier for said clamp movable to carry a book from the feeding position to a cover-applying position, an automatic book-feeder constructed to feed a book to be covered back downward between the plates of the clamp, mechanism for subsequently operating the clamp to cause it to close upon the book, and mechanism for subsequently operating the carrier to cause it to carry the book beyond the feeding position.

10. In a book covering machine, the combination of a book-holding clamp, comprising two opposite upright clamping plates adapted to grasp a book flatwise between them, a chute for holding a stack of books, in upright position, backs downward and a reciprocating book-pusher adapted to engage the end book of the stack and push it from the chute to deliver it back downward into said clamp.

11. In a book covering machine, the combination of a book-holding clamp, a chute for holding a stack of books, having a bottomless end portion and stop plates, and a vertically reciprocating plunger moving over against said bottomless portion and adapted to engage the end book of the stack and push it down through the bottomless part of the chute into said clamp.

12. In a book covering machine, the combination to form a book-feeder of a chute for holding a stack of books back downward, approximately horizontal at its outlet end and curving thence upward so that the weight of the upper books of the stack will press the lower books to the outlet end, having stop-plates and an outlet opening at the outlet end, and a reciprocating plunger adapted in its movement to engage the end book and push it through the outlet opening.

13. In a book covering machine, the combination to form a book-feeder of a chute for holding a stack of books in upright position back downward, constructed with a stationary bottom and side, and with the opposite side adjustable out or in to accommodate the chute to different lengths of books, and with a bottom opening and stop-plates at its outlet end, and a vertically reciprocating plunger working through the outlet end of the chute.

14. In a book covering machine, the combination to form a book feeder of a chute for holding a stack of books back downward, having a bottom opening and stop-plates at its outlet end, and a reciprocating plunger working through the outlet end of the chute formed with a horizontal bottom adapted in its descent to push the end book down through said bottom opening, and a vertical wall adapted to hold back the next succeeding book and prevent its moving to the end of the chute till the reascent of the plunger.

15. In a book covering machine, the combination of a chute for holding a stack of books, having a bottomless outlet and provided with stop-plates, a reciprocating pusher for ejecting the end book therefrom, an end-gage, and a push-plate engaging the opposite end of the book as it is fed, and acting to press it against said end-gage.

16. In a book-covering machine, the combination of a book-holding clamp, an end-gage for determining the proper longitudinal position of the book relatively to said clamp, and a push-plate engaging the opposite end of the book and acting to press it against said end gage.

17. In a book covering machine, the combination of a book holding clamp comprising opposite clamping plates or jaws and having mechanism for forcing them together to grasp a book between them, a cover-applier mounted to be movable relatively toward said clamp to approach it in an invariable position relatively thereto, and adapted to press the middle of a cover against the back of a book held by said clamp, means for so moving the same to bring the book and cover together, an end gage having a fixed location relatively to said clamp, and means acting before the mechanism for closing said clamp to press the end of a book fed thereto against said end gage, whereby the grasping of the book in invariable longitudinal position, and its presentation in invariable relation to said cover applier are insured.

18. In a book covering machine, the combination of an automatically closing book holding clamp, a carrier therefor movable to carry the clamp from the book feeding position to a cover-applying position, driving mechanism for so moving said carrier, a cover-applier movable toward and from the clamp in the latter position, and adapted to press the middle of a cover against the back of a book held by said clamp, means for moving said cover applier, and an end gage carried by said carrier and having a fixed location relatively to said clamp for determining the proper longitudinal position of the book in said clamp, whereby the union of the book and cover in correct relative positions is effected.

19. In a book covering machine, the combination of a book holding clamp open at top and bottom and having opposite jaws or clamping plates for embracing the sides of a book with its back exposed and projecting beneath, means for feeding a book into said clamp from above, a back gage for determining the proper projection of the back of the book beyond said clamp consisting of a plate beneath the clamp against which the back of the book rests when introduced in said clamp, means for operating the clamp to close its plates together to grasp the book, and a cover-applier movable toward and from the clamp to press the middle of a cover against the back of a book held in said clamp, and means for so moving said cover-applier.

20. In a book-covering machine, the combination of a book-holding clamp having opposite upright jaws or clamping plates for embracing the sides of a book with its back exposed and projecting, a carrier for moving said clamp from a book-feeding position to a cover-applying position, driving mechanism for so moving said carrier, a gummer located between said positions and adapted to apply adhesive material to the back of the book in transit, a cover applier in said latter position movable toward the clamp to press the middle of a cover against the back of the book, means for so moving said cover applier, and a back-gage consisting of a plate mounted beneath said clamp at the book feeding position and adapted to support the back of a book dropped into the clamp until the latter is closed upon it and to determine the proper projection of the back of the book beyond the clamp to co-operate with said gummer and cover-applier.

21. In a book covering machine, a book-holding clamp comprising opposite clamping plates, a spring for pressing them together to grasp the book, an operating toggle lever adapted to force them apart, and cam-operated tappets for acting on said toggle lever to straighten it and force the clamp open, or to trip it and enable the spring to close the clamp.

22. In a book-covering machine, the combination with a book-holding clamp of a cover-applier consisting of a vertically movable plate adapted to carry a pile of covers, mechanism for lifting this plate at intervals to exert a positive upward thrust to press the topmost cover against the book, and a feeding mechanism adapted to feed up said plate at each cover-applying movement sufficiently to compensate for the thickness of the cover removed from the pile.

23. In a book-covering machine, the combination with a book-holding clamp of a cover-applier consisting of a vertically movable plate, an upright screw-threaded rod carrying it, a nut engaging the threads of said rod, a lever supporting said nut and adapted to lift it and said rod and plate, a cam for imparting the lifting movements to said lever, and a ratchet and pawl adapted at each cover-applying movement to turn said nut and thereby feed up said screw-rod and plate sufficiently to compensate for the thickness of the cover removed from the pile.

24. In a book-covering machine, the combination with cover-applying mechanism for affixing the middle portion of a cover in a flat condition against the back of a book, and a book-holding clamp consisting of jaws or plates adapted to embrace the opposite sides of a book with its back portion exposed and projecting, of a cover-folder consisting of opposite upwardly-moving plates adapted to move from beneath against the opposite sides of the projecting back-portion of a book held by said clamp and fold the cover around the back of the book, and driving mechanism for operating said cover-folder.

25. In a book-covering machine, the combination with cover-applying mechanism for affixing the middle portion of a cover in flat condition against the back of a book, of a book-holding clamp consisting of jaws or plates adapted to embrace the opposite sides of a book with its back-portion to which the unfolded cover is applied exposed and projecting, and a cover-folder consisting of opposite upwardly-moving plates adapted to move from beneath against the opposite sides of the projecting back-portion of the book held by said clamp to fold the cover around the back of the book, and driving mechanism for operating said plates.

26. In a book-covering machine, the combination of a book-holding clamp consisting of jaws or plates adapted to embrace the opposite sides of a book with its back portion exposed and projecting, with a cover-folder consisting of opposite clamping plates movable upwardly and toward each other, wholly beneath said clamp, to engage the projecting back-portion of the book held thereby and first fold the cover against the sides of the book and then squeeze the book and cover between them.

27. In a book-covering machine, the combination with a book-holding clamp consisting of jaws or plates adapted to embrace the opposite sides of a book with its back-portion exposed and projecting, of a cover-folder consisting of opposite cover-folding-and-stretching plates movable wholly beneath said clamp, moving first upwardly and toward each other to fold the cover against the sides of the projecting portion of the book, and moving subsequently upward against the sides of the book to stretch the cover tightly around the back of the book, and operating mechanism for so moving said plates.

28. In a book-covering machine, the combination with a book-holding clamp consisting of jaws or plates adapted to embrace the opposite sides of a book with its back-portion exposed and projecting, of a cover-folder consisting of opposite clamping plates movable wholly beneath said clamp and mounted on rods, oscillatory bearings for guiding said rods, and mechanism for imparting to said plates a movement upwardly and toward each other whereby they swing around said bearings while folding and clamping the cover against the sides of the book.

29. In a book covering machine, the combination with a book-holding clamp, of a cover folder consisting of opposite clamping plates, lever arms and rods carrying said plates, and a cam driving mechanism for oscillating said lever arms to impart to said plates an upward and inward movement to clamp the book between them.

30. In a book covering machine, the combination with a book carrier, cover applier, and cover-folder, of guiding rods for upholding the projecting sides of the unfolded cover during its movement from the cover-applying position to the cover-folding position.

31. The combination with cover-applying-and-folding mechanisms, of a book-carrying mechanism having a succession of clamps for holding the covered books constructed to grasp the sides of the books with the backs thereof exposed, means for advancing the same intermittently, and a plurality of back-pressers arranged at the stopping positions of the successive books and adapted as each book moves to its successive stopping positions to repeatedly exert a pressure against its back.

32. In a book-covering machine, the combination with book-carrying clamps and mechanism for opening them in a delivery position to permit the covered books to drop out, of a receiving table, and a pusher-plate mounted on a swinging arm and movable from a position for receiving upon it the book dropped from the clamp to a position against the row of books on said table, to push the book thereagainst and make room for the next succeeding book.

33. In a book covering machine, the combination with cover-applying and cover-folding mechanisms of primary and secondary book-holding clamps, reciprocating carriers therefor, and mechanism for operating said clamps, constructed to engage the secondary clamp upon the book carried by the primary clamp to the cover-applying position, and subsequently to release the primary clamp therefrom, whereby the book is transferred from the primary to the secondary clamp.

34. In a book covering machine, the combination with cover-applying and cover-folding mechanisms of a primary book-holding clamp and carrier, adapted to carry a book from a folding to a cover-applying position, a secondary book-holding clamp and carrier, adapted to carry the book from the cover-applying to a cover-folding position, a drier having clamps for carrying successive books, a conveyer for conducting the books from the cover-folding position to said drier, and mechanism for operating the respective clamps to cause the primary clamp to deliver the books to the secondary clamp, the secondary clamp to deliver them to the conveyer, and the drier clamps to engage the books from said conveyer, and to finally release them in a delivery position.

35. In a book covering machine, the combination with a cover-applier and a book-holding clamp for carrying the books therefrom to a cover-folding position, of a cover-folder, comprising opposite cover-folding clamping plates movable to fold the cover against the sides of the book, and to clamp the book between them, and operating mechanism adapted to release said clamp while the book is between the plates of the cover-folder, and subsequently to retract the latter to drop the book.

Signed at New York, in the county of New York and State of New York, this 9th day of July, 1889.

CHARLES W. LOVELL.
    ALFRED BREDENBERG.

Witnesses:
 PHILLIPS ABBOTT,
 FREDERICK SMITH.